United States Patent
Lee et al.

(10) Patent No.: US 10,108,065 B2
(45) Date of Patent: Oct. 23, 2018

(54) LIQUID CRYSTAL DISPLAY DEVICE

(71) Applicant: SAMSUNG DISPLAY CO., LTD., Yongin-si (KR)

(72) Inventors: Sunhwa Lee, Yongin-si (KR); Sanguk Lim, Yongin-si (KR); Meehye Jung, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 241 days.

(21) Appl. No.: 15/003,436

(22) Filed: Jan. 21, 2016

(65) Prior Publication Data

US 2016/0216578 A1    Jul. 28, 2016

(30) Foreign Application Priority Data

Jan. 26, 2015  (KR) .................. 10-2015-0012198

(51) Int. Cl.
| | |
|---|---|
| *G02F 1/1343* | (2006.01) |
| *G02F 1/1368* | (2006.01) |
| *G02F 1/1362* | (2006.01) |
| *G02F 1/136*  | (2006.01) |

(52) U.S. Cl.
CPC .......... *G02F 1/1368* (2013.01); *G02F 1/1362* (2013.01); *G02F 2001/13606* (2013.01)

(58) Field of Classification Search
None
See application file for complete search history.

(56) References Cited

U.S. PATENT DOCUMENTS

| | | | |
|---|---|---|---|
| 2003/0222315 A1* | 12/2003 | Amundson | G09G 3/344 |
| | | | 257/368 |
| 2013/0161663 A1 | 6/2013 | Amundson et al. | |
| 2013/0208206 A1 | 8/2013 | Park et al. | |
| 2013/0292795 A1 | 11/2013 | Pyon et al. | |

FOREIGN PATENT DOCUMENTS

| | | |
|---|---|---|
| KR | 1020080080418 | 9/2008 |
| KR | 1020130092321 | 8/2013 |
| KR | 1020130124736 | 11/2013 |

* cited by examiner

*Primary Examiner* — Richard Kim
(74) *Attorney, Agent, or Firm* — Cantor Colburn LLP

(57) ABSTRACT

A liquid crystal display device includes a first substrate, a second substrate opposing the first substrate, a liquid crystal layer between the first substrate and the second substrate, a black matrix on one of the first substrate and the second substrate, the black matrix defining a pixel region, a gate line on the first substrate and including a line portion, an electrode portion and a compensation portion, the compensation portion having a closed loop shape, a data line intersecting the gate line, a source electrode extending from the data line and disposed on the electrode portion of the gate line, a drain electrode including one side disposed on the electrode portion of the gate line and another side at least partially disposed on the compensation portion of the gate line, and a pixel electrode connected to the drain electrode.

6 Claims, 11 Drawing Sheets

LIQUID CRYSTAL DISPLAY DEVICE

This application claims priority to Korean Patent Application No. 10-2015-0012198, filed on Jan. 26, 2015, and all the benefits accruing therefrom under 35 U.S.C. § 119, the content of which in its entirety is herein incorporated by reference.

BACKGROUND

1. Field

Exemplary embodiments of the invention relate to a liquid crystal display ("LCD") device capable of efficiently reducing (i.e., minimizing) a capacitance difference between pixels, in particular when a mask is misaligned.

2. Description of the Related Art

An LCD device is a type of flat panel display ("FPD"), which is most widely used these days. An LCD device generally includes two substrates including two electrodes respectively formed thereon and a liquid crystal layer interposed therebetween. Upon applying voltage to the two electrodes, liquid crystal molecules of the liquid crystal layer are rearranged, thereby adjusting an amount of transmitted light.

The LCD device includes a plurality of pixels, and each pixel includes a thin film transistor ("TFT") provided thereon The TFT may include a gate electrode, a source electrode, and a drain electrode. In this regard, various patterns including the gate electrode, the source electrode, and the drain electrode may be formed through a photolithography method including a deposition process, a light exposure process, a developing process, and an etching process. A mask having a predetermined pattern is used, in particular, in the light exposure process, and the mask includes a plurality of transmission parts and shielding parts. Light emitted from a light exposure apparatus may selectively pass the mask only through the transmission parts thereof, and may be irradiated on materials deposited on the substrate.

SUMMARY

Exemplary embodiments of the invention are directed to a liquid crystal display ("LCD") device capable of efficiently reducing (i.e., minimizing) a capacitance difference between pixels, although a mask is misaligned.

According to an exemplary embodiment, an LCD device includes a first substrate, a second substrate opposing the first substrate, a liquid crystal layer between the first substrate and the second substrate, a black matrix on one of the first substrate and the second substrate, the black matrix configured to define a pixel region, a gate line on the first substrate and including a line portion, an electrode portion and a compensation portion, the compensation portion having a closed loop shape, a data line intersecting the gate line, a source electrode extending from the data line to be disposed on the electrode portion of the gate line, a drain electrode, one side of the drain electrode being disposed on the electrode portion of the gate line and another side thereof at least partially being disposed on the compensation portion of the gate line, and a pixel electrode in the pixel region, the pixel electrode connected to the drain electrode.

In an exemplary embodiment, the LCD device may further include a compensation bar on a side opposite to the pixel electrode with the compensation portion of the gate line interposed therebetween, the compensation bar being integrally provided with the pixel electrode.

In an exemplary embodiment, the compensation bar may be parallel to the line portion of the gate line.

In an exemplary embodiment, the LCD device may further include a storage line overlapping at least one of the pixel electrode and the compensation bar.

In an exemplary embodiment, the LCD device may further include a compensation electrode extending from the drain electrode to be at least partially disposed on the compensation portion of the gate line.

In an exemplary embodiment, the pixel electrode may include a stem electrode configured to partition the pixel region into a plurality of domains, and a branch electrode extending from the stem electrode to each of the plurality of domains.

In an exemplary embodiment, the LCD device may further include a color filter disposed on the first substrate.

According to another exemplary embodiment, an LCD device includes a first substrate, a second substrate opposing the first substrate, a liquid crystal layer between the first substrate and the second substrate, a black matrix on one of the first substrate and the second substrate, the black matrix configured to define a pixel region, a gate line on the first substrate and including a line portion, an electrode portion and a compensation portion, the compensation portion having a closed loop shape, a data line intersecting the gate line, a source electrode extending from the data line to be disposed on the electrode portion of the gate line, a drain electrode, one side of the drain electrode being disposed on the electrode portion of the gate line and another side thereof being at least partially disposed on the compensation portion of the gate line, a connecting electrode extending from the drain electrode to the pixel region, and a pixel electrode in the pixel region, the pixel electrode connected to the connecting electrode.

In an exemplary embodiment, the LCD device may further include a compensation bar on a side opposite to the pixel electrode having the compensation portion of the gate line interposed therebetween, the compensation bar integrally provided with the pixel electrode.

In an exemplary embodiment, the LCD device may further include a storage line overlapping at least one of the pixel electrode and a compensation bar of another pixel.

In an exemplary embodiment, the LCD device may further include a first compensation electrode extending from the drain electrode in one direction to be at least partially disposed on the compensation portion of the gate line.

In an exemplary embodiment, the LCD device may further include a second compensation electrode extending from the drain electrode in another direction to be at least partially disposed on the compensation portion of the gate line.

In an exemplary embodiment, the connecting electrode may be connected to the pixel electrode in the pixel region.

In an exemplary embodiment, the pixel electrode may include a stem electrode configured to partition the pixel region into a plurality of domains, and a branch electrode extending from the stem electrode to each of the plurality of domains.

In an exemplary embodiment, the connecting electrode may overlap the stem electrode of the pixel electrode.

According to still another exemplary embodiment, an LCD device includes a first substrate, a second substrate opposing the first substrate, a liquid crystal layer between the first substrate and the second substrate, a black matrix on one of the first substrate and the second substrate, the black matrix configured to define a pixel region, a first sub-gate line on the first substrate, the first sub-gate line including a first line portion and a first electrode portion, a second sub-gate line on the first substrate, the second sub-gate line including a second line portion and a second electrode portion, a data line intersecting the first and second sub-gate lines, a first source electrode extending from the data line to be disposed on the first electrode portion of the first sub-gate line, a second source electrode extending from the data line to be disposed on the second electrode portion of the second sub-gate line, a connecting electrode, one side of the connecting electrode being disposed on the first electrode portion of the first sub-gate line and another side thereof being disposed on the second electrode portion of the second sub-gate line, a drain electrode extending from the connecting electrode to be disposed between the first sub-gate line and the second sub-gate line, and a pixel electrode in the pixel region, one side of the pixel electrode connected to the drain electrode.

In an exemplary embodiment, the LCD device may further include a compensation bar on a side opposite to the pixel electrode with the first and second sub-gate lines interposed therebetween, the compensation bar integrally provided with the pixel electrode.

In an exemplary embodiment, the LCD device may further include a repair line between the first sub-gate line and the second sub-gate line, the repair line overlapping the drain electrode.

In an exemplary embodiment, the first sub-gate line and the second sub-gate line may be connected to each other.

In an exemplary embodiment, according to exemplary embodiments of the invention, an LCD device may have the following effects.

In an exemplary embodiment, a capacitance difference between pixels may be efficiently reduced, although a mask is misaligned.

The foregoing is illustrative only and is not intended to be in any way limiting. In addition to the illustrative exemplary embodiments, and features described above, further exemplary embodiments, and features will become apparent by reference to the drawings and the following detailed description.

BRIEF DESCRIPTION OF THE DRAWINGS

The above and other features and exemplary embodiments of the invention of invention will be more clearly understood from the following detailed description taken in conjunction with the accompanying drawings, in which.

DETAILED DESCRIPTION

Figure 1:
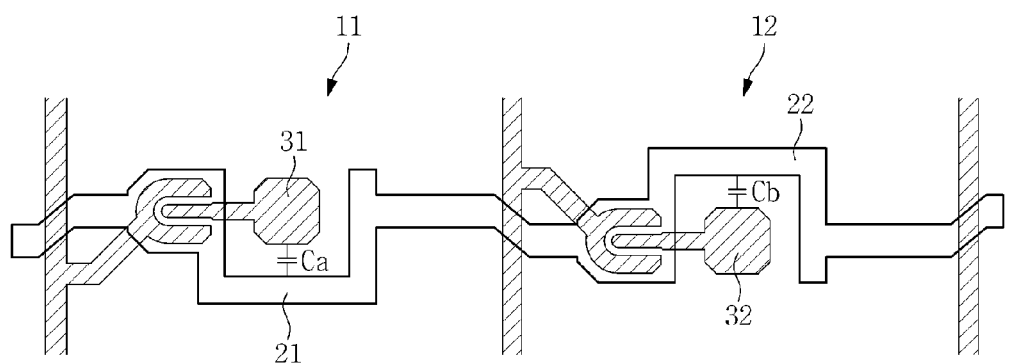
FIG. 1 is a view illustrating drawbacks occurring in a conventional liquid crystal display ("LCD") device.

Advantages and features of the invention and methods for achieving them will be made clear from embodiments described below in detail with reference to the accompanying drawings. The invention may, however, be embodied in many different forms and should not be construed as being limited to the embodiments set forth herein. Rather, these embodiments are provided so that this invention will be thorough and complete, and will fully convey the scope of the invention to those skilled in the art. The invention is merely defined by the scope of the claims. Therefore, well-known constituent elements, operations and techniques are not described in detail in the embodiments in order to prevent the invention from being obscurely interpreted. Like reference numerals refer to like elements throughout the specification.

In the drawings, thicknesses are illustrated in an enlarged manner in order to clearly describe a plurality of layers and areas. Like reference numbers are used to denote like elements throughout the specification. When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

In order to accurately align patterns, which are formed using different masks, the masks need to be aligned in a proper position by an alignment apparatus. However, due to malfunctions of the alignment apparatus or errors made by workers, the mask may be misaligned. In such cases, for example, capacitance between a gate electrode and a drain electrode may become different for each pixel, thus incurring significant image-quality degradation. An example of such an issue will be described below with reference to FIG. 1.

FIG. 1 is a view illustrating the drawbacks occurring in conventional LCD devices.

In reference to FIG. 1, when a mask for forming drain electrodes 31 and 32 is misaligned and thus the drain electrodes 31 and 32 are formed downwardly with reference to the desired position, the drain electrode 31 and a gate line 21 of a first pixel 11 become relatively closer in distance, whereas the drain electrode 32 and a gate line 22 of a second pixel 12 become relatively farther from each other in distance. Accordingly, the capacitance of a capacitor Ca formed between the drain electrode 31 and the gate line 21 of the first pixel 11 may increase, whereas the capacitance of a capacitor Cb formed between the drain electrode 32 and the gate line 22 of the second pixel 12 may decrease. As a result, a capacitance deviation occurs between the first pixel and the second pixel, and thereby image quality degradation may be caused.

Figure 2:
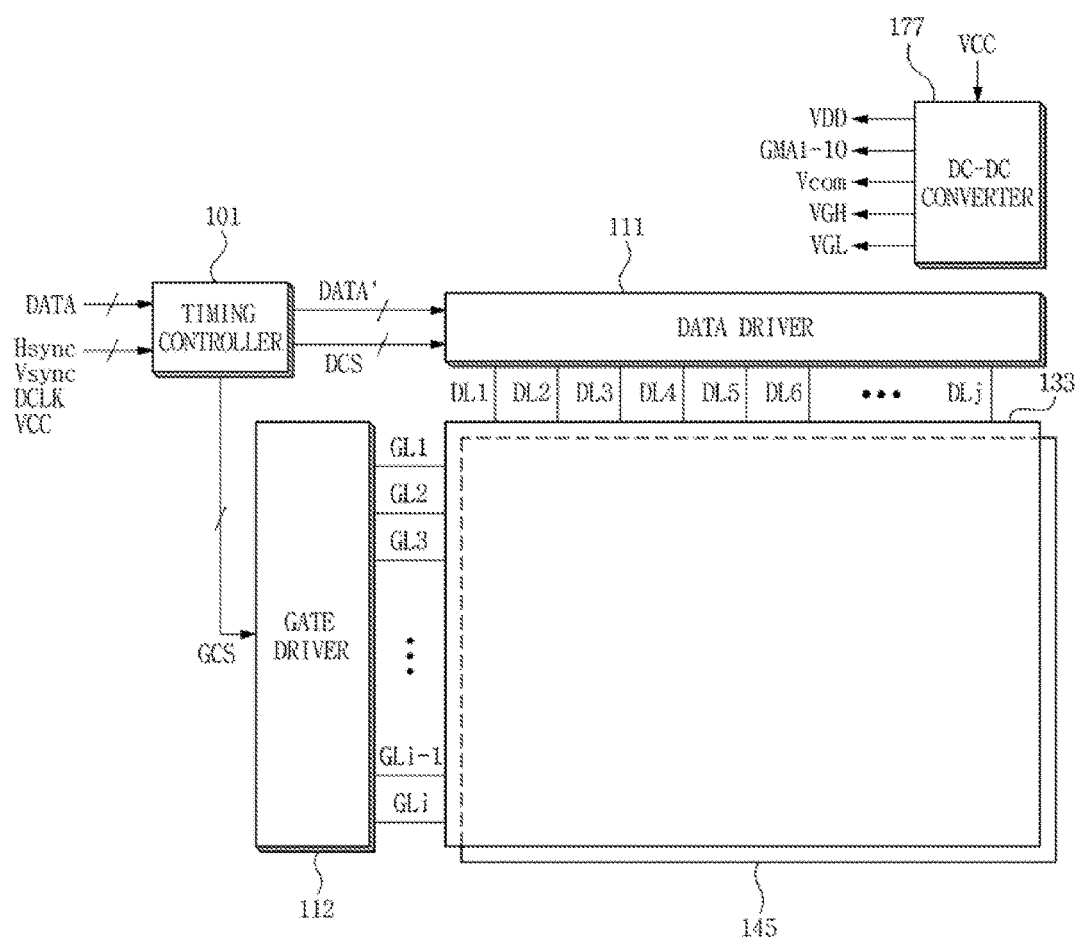
FIG. 2 is a block diagram illustrating an exemplary embodiment of an LCD device according to the invention.
Figure 3:
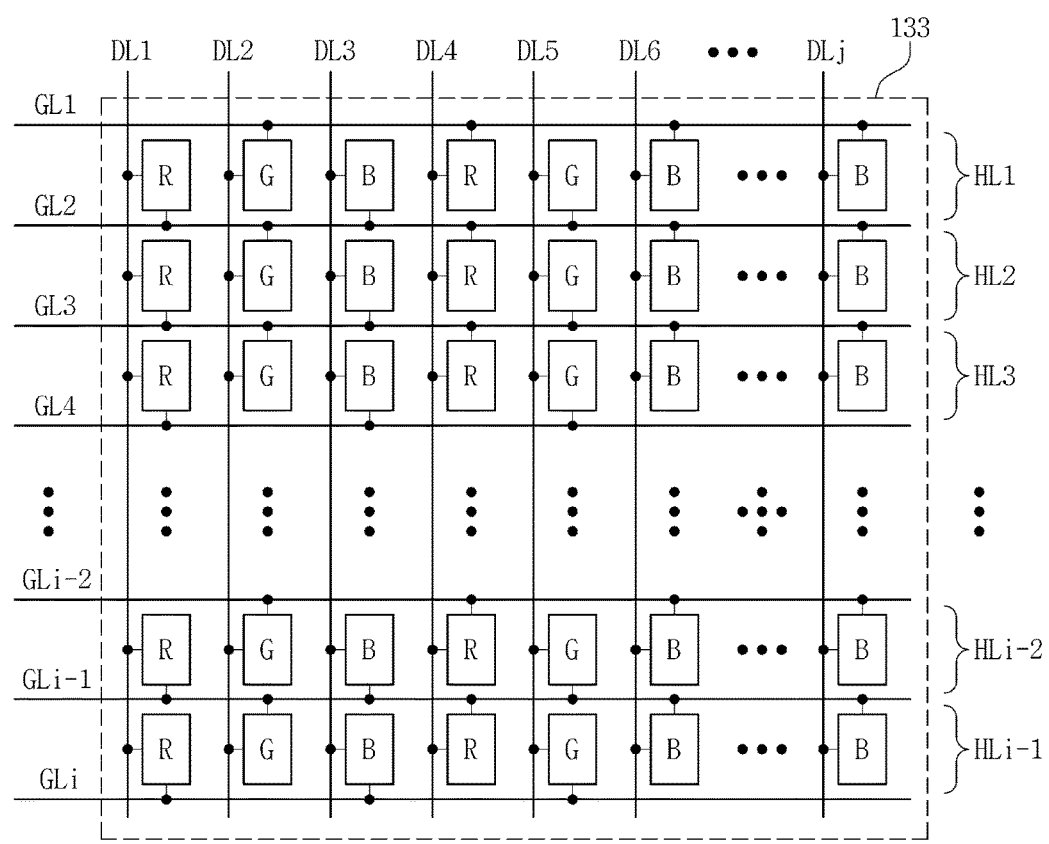
FIG. 3 is a detailed configuration view illustrating a display panel of FIG. 2.

FIG. 2 is a block diagram illustrating a liquid crystal display ("LCD") device according to an exemplary embodiment. FIG. 3 is a detailed configuration view illustrating a display panel of FIG. 2.

According to an exemplary embodiment, the LCD device, as illustrated in FIG. 2, may include a display panel 133, a timing controller 101, a gate driver 112, a data driver 111, a backlight unit 145, and a direct current ("DC")-DC converter 177.

The display panel 133 may display images. The display panel 133 may include a liquid crystal layer 333 (refer to FIG. 6), and a first substrate 301 (refer to FIG. 6) and a second substrate 302 (refer to FIG. 6) that face each other while the liquid crystal layer 333 being interposed therebetween.

On the respective surfaces of the first and second substrates 301 and 302 that face each other, the following elements may be disposed, which will be described below in detail.

On the first substrate 301, as illustrated in FIG. 2, a plurality of gate lines GL1 through GLi, a plurality of data lines DL1 through DLj intersecting the gate lines GL1 through GLi, and a plurality of thin film transistors TFT (refer to FIG. 4) connected to the gate lines GL1 through GLi and the data lines DL1 through DLj are disposed.

A plurality of color filters 354 (refer to FIG. 6) are further disposed on the first substrate 301 and a black matrix 376 (refer to FIG. 6) is disposed on the second substrate 302. The black matrix 376 may be disposed on a portion of the second substrate 302, aside from portions corresponding to a pixel region P (refer to FIG. 4) of the display panel 133. The color filters 354 may be disposed in the pixel region P. In an exemplary embodiment, the color filters 354 may be categorized into a red color filter, a green color filter, and a blue color filter, for example. However, the invention is not limited thereto, and the color filters may include various other colors.

Referring to FIGS. 2 and 3, pixels R, G, and B may be arranged in a matrix form. The pixels R, G, and B may be categorized into red pixels R configured to display a red image, green pixels G configured to display a green image, and blue pixels B configured to display a blue image. The red pixel R may include the red color filter, the green pixel G may include the green color filter, and the blue pixel B may include the blue color filter. In this regard, the red pixel R, the green pixel G, and the blue pixel B, which are disposed adjacent to each other in a horizontal direction, may display a unit pixel to display a single unit image. The red pixel R, the green pixel G, and the blue pixel B in a horizontal direction may define rows HL1 to HLi–1.

A common electrode 330 (refer to FIG. 6) is provided on the second substrate 302. In an exemplary embodiment, the common electrode 330 may be disposed on an entire surface of the second substrate 302. However, the invention is not limited thereto, and the common electrode 330 may be disposed on a portion of the second substrate 302.

An overcoat layer 722 (refer to FIG. 6) may be further provided between the common electrode 330 and the black matrix 376.

J pixels arranged along an $n^{th}$ (n is a number selected from 1 to i–1) horizontal line (hereinafter, "$n^{th}$ horizontal line pixels") may be respectively connected to the first through the $j^{th}$ data lines DL1 through DLj. Further, the $n^{th}$ horizontal line pixels may be connected to the $n^{th}$ gate line and the $n+1^{th}$ gate line together. In an exemplary embodiment, odd-numbered pixels of the $n^{th}$ horizontal line pixels (i.e., pixels connected to the odd-numbered data lines) are connected to the $n+1^{th}$ gate line, in common, and even-numbered pixels of the $n^{th}$ horizontal line pixels (i.e., pixels connected to the even-numbered data lines) are connected to the $n^{th}$ gate line, in common, for example. Accordingly, the odd-numbered pixels of the $n^{th}$ horizontal line pixels may receive an $n+1^{th}$ gate signal together, and the even-numbered pixels of the $n^{th}$ horizontal line pixels may receive an $n^{th}$ gate signal together. That is, the odd-numbered pixels of the $n^{th}$ horizontal line pixels and the even-numbered pixels of the $n+1^{th}$ horizontal line pixels may receive an identical gate signal.

The timing controller 101 may receive a vertical synchronization signal Vsync, a horizontal synchronization signal Hsync, an image data signal DATA, and a clock signal DCLK output from a graphic controller (not illustrated)

provided in a system. An interface circuit (not illustrated) may be provided between the timing controller 101 and the system, and the signals output from the system are input to the timing controller 101 via the interface circuit. The interface circuit may be embedded in the timing controller 101.

Although not illustrated, the interface circuit may include a low voltage differential signaling ("LVDS") receiver, for example. The interface circuit may lower voltage levels of the vertical synchronization signal Vsync, the horizontal synchronization signal Hsync, the image data signal DATA, and the clock signal DCLK output from the system, but may increase frequencies thereof.

Due to a high-frequency component of the signal input from the interface circuit to the timing controller 101, electromagnetic interference ("EMI") may be caused therebetween. In order to prevent the EMI interference, an EMI filter (not illustrated) may be further provided between the interface circuit and the timing controller 101.

The timing controller 101 may generate a gate control signal for controlling the gate driver 112 and a data control signal for controlling the data driver 111, based on the vertical synchronization signal Vsync, the horizontal synchronization signal Hsync, and the clock signal DCLK. In an exemplary embodiment, the gate control signal may include a gate start pulse, a gate shift clock, a gate output enable signal, and the like. In an exemplary embodiment, the data control signal may include a source start pulse, a source shift clock, a source output enable signal, a polarity signal, and the like.

Further, the timing controller 101 may rearrange the image data signals DATA input through the system and supply the rearranged image data signals DATA' to the data driver 111.

The timing controller 101 may be operated by a driving power VCC output from a power unit provided in the system. In particular, the driving power VCC is used as a power voltage of a phase lock loop ("PLL") embedded in the timing controller 101. The PLL may compare the clock signal DCLK input to the timing controller 101 with a reference frequency generated by an oscillator. In the case where there is a difference between the compared values, the PPL may adjust the frequency of the clock signal by the difference to thereby produce a sampling clock signal. The sampling clock signal may be a signal used to sample the image data signals DATA'.

The DC-DC converter 177 may increase or decrease the driving power VCC input through the system to thereby produce voltages required for the display panel 133. To this end, the DC-DC converter 177 may include, for example, an output switching element for switching an output voltage of an output terminal thereof, and a pulse width modulator ("PWM") for adjusting a duty ratio or a frequency of a control signal applied to a control terminal of the output switching element so as to increase or decrease the output voltage. Herein, the DC-DC converter 177 may include a pulse frequency modulator ("PFM"), instead of the PWM.

The PWM may increase the duty ratio of the aforementioned control signal to increase the output voltage of the DC-DC converter 177 or decrease the duty ratio of the control signal to lower the output voltage thereof. The PFM may increase the frequency of the aforementioned control signal to increase the output voltage of the DC-DC converter 177 or decrease the frequency of the control signal to lower the output voltage of the DC-DC converter 177. In an exemplary embodiment, the output voltage of the DC-DC converter 177 may include a reference voltage VDD of about 6 volts (V) or more, a gamma reference voltage GMA1-10 less than level 10, a common voltage Vcom in a range of about 2.5 V to about 3.3 V, a gate high voltage VGH of about 15 V or more, and a gate low voltage VGL of about −4 V or less, for example.

The gamma reference voltage GMA1-10 is a voltage generated by voltage division of the reference voltage. The reference voltage and the gamma reference voltage are analog gamma voltages, and they are provided to the data driver 111. The common voltage may be applied to the common electrode 330 of the display panel 133 via the data driver 111. The gate high voltage is a high logic voltage of the gate signal, which is set to be a threshold voltage of the TFT or more. The gate low voltage is a low logic voltage of the gate signal, which is set to be an off voltage of the TFT. The gate high voltage and the gate low voltage may be applied to the gate driver 112.

The gate driver 112 may generate gate signals according to the gate control signal GCS applied from the timing controller 101 and sequentially apply the gate signals to the plurality of gate lines GL1 through GLi. In an exemplary embodiment, the gate driver 112 may include, for example, a shift register configured to shift the gate start pulse according to the gate shift clock to generate the gate signals. The shift register may include a plurality of switching elements. The switching elements may be disposed on the first substrate 301 in the same process as that of the TFT in a display area.

The data driver 111 may receive the image data signals DATA' and the data control signal DCS from the timing controller 101. The data driver 111 may perform sampling of the image data signals DATA' according to the data control signal DCS, perform latching of the sampled image data signals corresponding to one horizontal line each horizontal period, and apply the latched image data signals to the data lines DL1 through DLj. That is, the data driver 111 may convert the image data signals DATA' applied from the timing controller 101 into analog image data signals using the gamma reference voltages GMA1-10 input from the DC-DC converter 177 and provide the analog image data signals to the data lines DL1 through DLj.

The backlight unit 145 is configured to provide light to the display panel 133. To this end, the backlight unit 145 may include a plurality of light source arrays. Herein, each light source array may include at least one light source, and the light source may be a light emission package including at least one light emitting diode ("LED"), for example. However, the invention is not limited thereto, and backlight unit 145 may include various other types of light sources.

Figure 4:
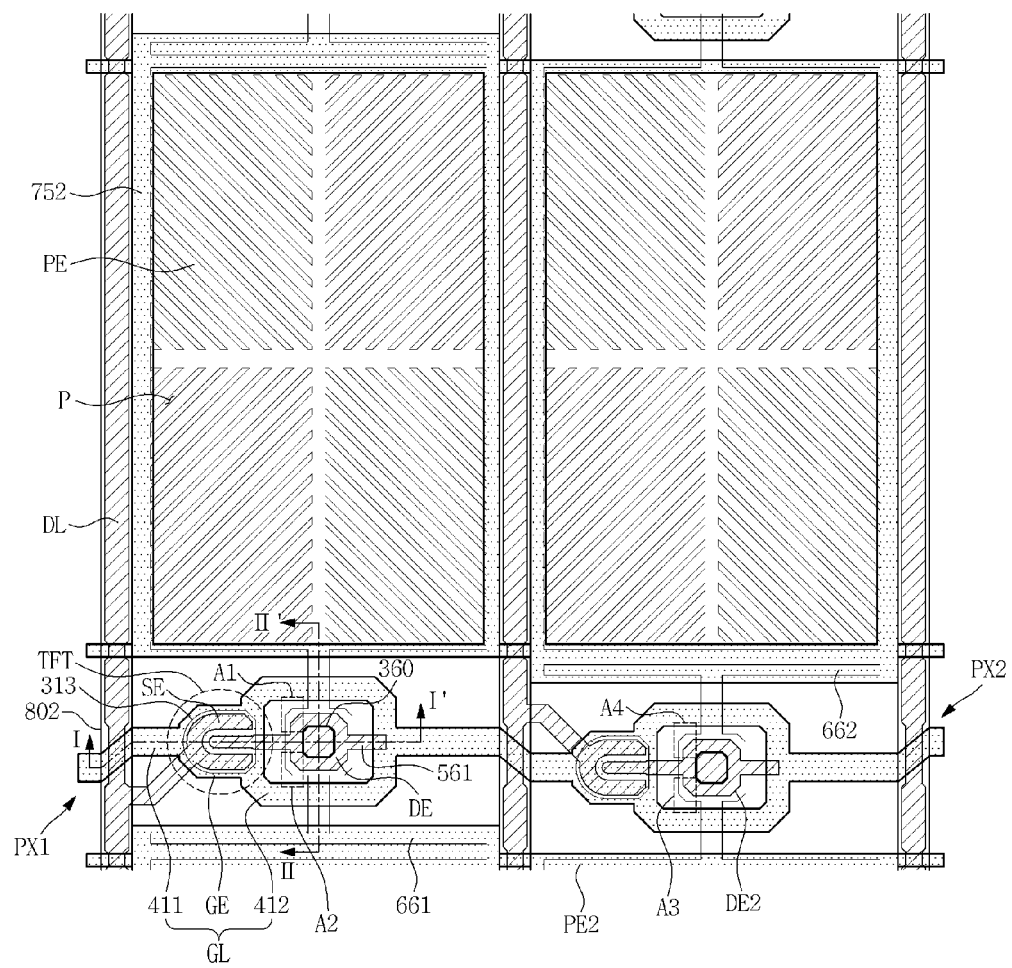
FIG. 4 is a detailed configuration view illustrating several pixels of FIG. 3.
Figure 5:
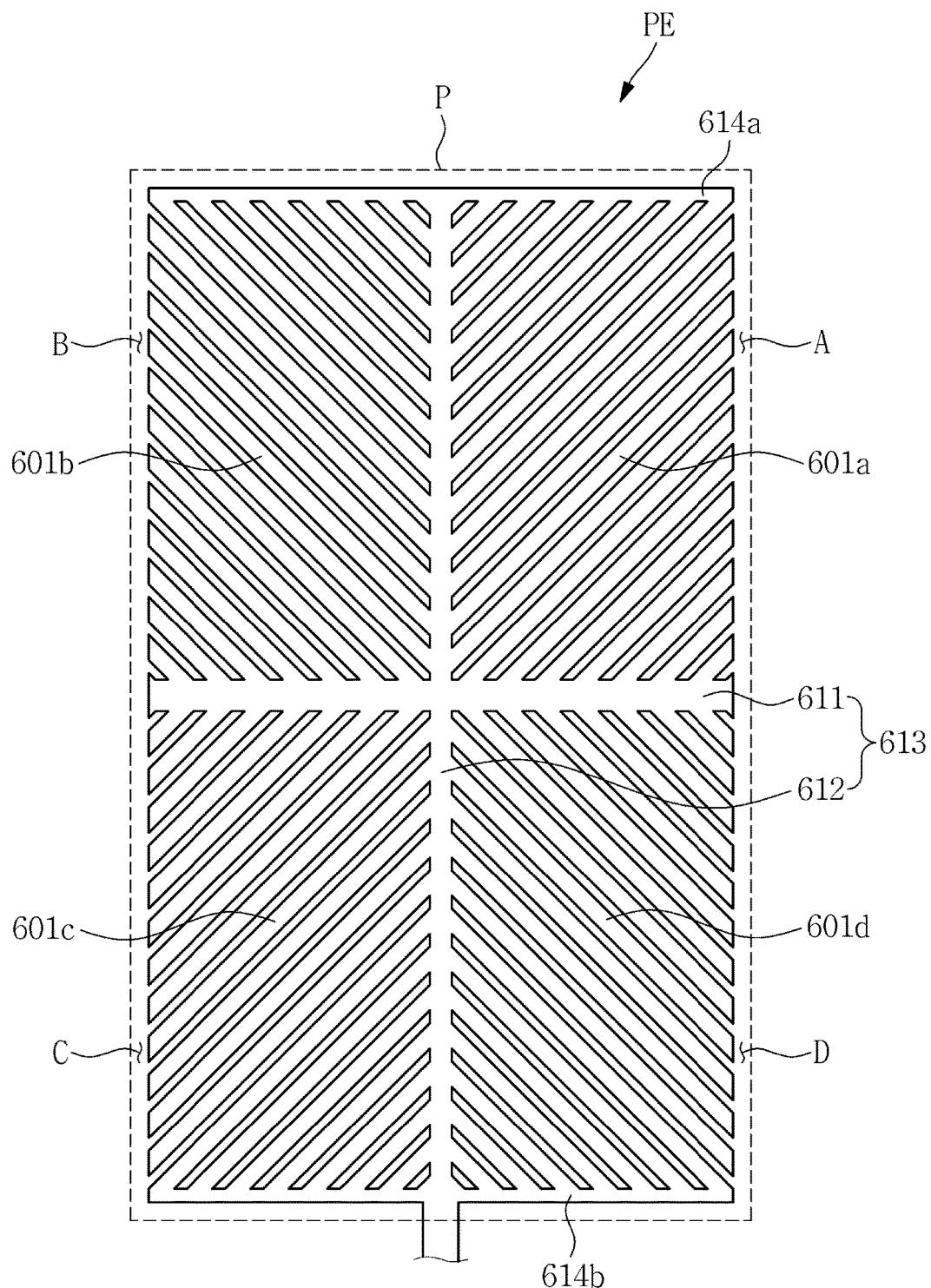
FIG. 5 is a view separately illustrating a pixel electrode of FIG. 4.
Figure 6:
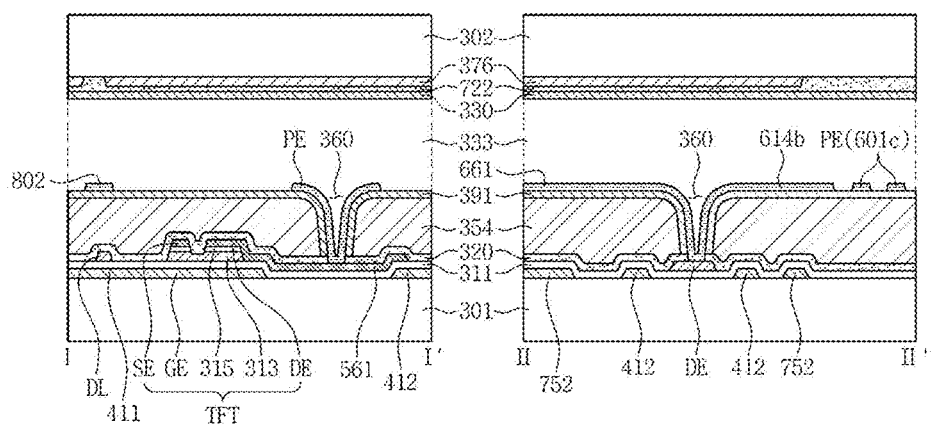
FIG. 6 is a cross-sectional view taken along line I-I' and line II-II' of FIG. 4.

FIG. 4 is a detailed configuration view illustrating several pixels of FIG. 3. FIG. 5 is a view separately illustrating a pixel electrode of FIG. 4. FIG. 6 is a cross-sectional view taken along line I-I' and line II-II' of FIG. 4.

Each pixel, as illustrated in FIGS. 4 through 6, includes a thin film transistor ("TFT"), a storage line 752, a color filter 354, a pixel electrode PE, a common electrode 330, and a liquid crystal layer 333. Herein, the TFT, as illustrated in FIGS. 4 and 6, includes a gate electrode GE, a semiconductor layer 313, a source electrode SE, and a drain electrode DE. The common electrode 330 of the respective pixels may be integrally provided and the liquid crystal layer 333 of the respective pixels may be integrally provided.

As illustrated in FIGS. 4 and 6, the gate line GL is disposed on the first substrate 301. The gate line GL may include a line portion 411, an electrode portion GE, and a compensation portion 412. The line portion 411, the electrode portion GE, and the compensation portion 412 may be integrally provided. The electrode portion GE may be a gate electrode of the aforementioned TFT. The compensation portion 412 may have a closed-loop shape. Although not illustrated, the gate line GL may have a connection portion (e.g., an end portion), which is larger than other portions thereof in size, so as to be properly connected to another layer or external driving circuits. In an exemplary embodiment, the gate line GL may include at least a metal of aluminum (Al) or alloys thereof, silver (Ag) or alloys thereof, copper (Cu) or alloys thereof, and/or molybdenum (Mo) or alloys thereof, for example. In an exemplary embodiment, the gate line GL may include at least one of chromium (Cr), tantalum (Ta), and titanium (Ti), but is not limited thereto. In some exemplary embodiments, the gate line GL may have a multi-layer structure including at least two conductive layers that have different physical properties.

The storage line 752 may surround the pixel electrode PE. The storage line 752 may include the same material and may have the same structure (a multi-layer structure) as those of the gate line GL. In other words, the gate line GL and the storage line 752 may be simultaneously provided in the same process.

A gate insulating layer 311 is disposed on the gate line GL and the storage line 752. In this case, the gate insulating layer 311 may be disposed on the entire surface of the first substrate 301 including the gate line GL and the storage line 752. In an exemplary embodiment, the gate insulating layer 311 may include, for example, silicon nitrides ($SiN_x$), silicon oxides ($SiO_x$), or the like. The gate insulating layer 311 may have a multi-layer structure including at least two insulating layers that have physical properties different from each other.

The semiconductor layer 313 is disposed on the gate insulating layer 311. In this case, the semiconductor layer 313 may at least partially overlap the electrode portion GE of the gate line GL, that is, the gate electrode GE. In an exemplary embodiment, the semiconductor layer 313 may include amorphous silicon, polycrystalline silicon, or the like, for example.

An ohmic contact layer 315 is disposed on the semiconductor layer 313. In an exemplary embodiment, the ohmic contact layer 315 may include silicide or n+ hydrogenated amorphous silicon doped with n-type impurities, such as phosphorus, at high concentration. The ohmic contact layer 315 may be disposed on the semiconductor layer 313 in pairs.

The source electrode SE and the drain electrode DE are disposed on the ohmic contact layer 315.

The source electrode SE may extend from the data line DL and as illustrated in FIG. 4, may protrude toward the gate electrode GE. In this case, the source electrode SE may have a shape partially enclosing the drain electrode DE. At least a portion of the source electrode SE may overlap the semiconductor layer 313 and the gate electrode GE. In exemplary embodiments, the source electrode SE may be provided in one of a C-shape, an inverted C-shape, a U-shape, and an inverted U-shape, for example. However, the invention is not limited thereto, and the inverted U-shape may include various other shapes.

In some exemplary embodiments, it is desirable that the source electrode SE includes refractory metal, such as molybdenum, chromium, tantalum and titanium, or a metal alloy thereof, and may have a multi-layer structure including a refractory metal layer and a low-resistance conductive layer. Examples of the multi-layer structure may include a double-layer structure including a chromium or molybdenum (alloy) lower film and an aluminum (alloy) upper film, and a triple-layer structure including a molybdenum (alloy) lower film, an aluminum (alloy) intermediate film, and a molybdenum (alloy) upper film. Further, the source electrode SE may include various other types of metals or conductors rather than the aforementioned materials.

One side of the drain electrode DE may be disposed on the gate electrode GE. Another side of the drain electrode DE may at least partially overlap the semiconductor layer 313 and the gate electrode GE. At least a portion of the another side of the drain electrode DE may be disposed within the compensation portion 412 of the gate line GL. That is, at least a portion of the another side of the drain electrode DE may be enclosed by the compensation portion 412. The drain electrode DE may also include the same material and have the same structure (a multi-layer structure) as those of the source electrode SE. In other words, the drain electrode DE and the source electrode SE may be simultaneously provided in the same process.

The gate, source, and drain electrodes GE, SE, and DE may together define a TFT, along with the semiconductor layer 313. In this case, a channel of the TFT may be disposed on a portion of the semiconductor layer 313 between the source and drain electrodes SE and DE. A portion of the semiconductor layer 313 corresponding to the channel may have a thickness less than a thickness of other portions.

The data line DL is disposed on the gate insulating layer 311. Although not illustrated, the data line DL may have a connection portion (e.g., an end portion), which is larger than other portions thereof in size, so as to be properly connected to another layer or external driving circuits.

The data line DL may extend in its longitudinal direction to intersect the gate line GL and the storage line 752. The data line DL may have a line width at a portion where the data line DL and the gate line GL intersect each other less than a line width of other portions. Likewise, the data line DL may have a line width at a portion where the data line DL and the storage line 752 intersect each other less than a line width of other portions. Accordingly, a parasitic capacitance between the data line DL and the gate line GL and a capacitance between the data line DL and the storage line 752 may decrease. The data line DL may also include the same material and have the same structure (a multi-layer structure) as those of the source electrode SE. In other words, the data line DL and the source electrode SE may be simultaneously provided in the same process.

A passivation layer 320 is disposed on the data line DL, the source electrode SE, and the drain electrode DE. In this case, the passivation layer 320 may be disposed on the entire surface of the first substrate 301 including the data line DL, the source electrode SE, and the drain electrode DE. In an exemplary embodiment, the passivation layer 320 may include, for example, inorganic insulating materials such as silicon nitrides ($SiN_x$) and silicon oxides ($SiO_x$) When the passivation layer 320 includes an inorganic insulating material, an inorganic insulating material having photosensitivity and a dielectric constant of about 4.0 may be used. In an exemplary embodiment, the passivation layer 320 may also have a double-layer structure including a lower inorganic layer and an upper organic layer, which has been found to impart desirable insulating properties and also to prevent damage to exposed portions of the semiconductor layer 313. As examples, the passivation layer 320 may have a thickness of about 5000 angstroms (Å) or more and may be about 6000 Å to about 8000 Å.

A lower contact hole may be defined through the passivation layer 320, and the drain electrode DE may be partially exposed through the lower contact hole.

As illustrated in FIG. 6, the color filter 354 is disposed on the passivation layer 320. The color filter 354 may be disposed in the pixel region P, and in this case, an edge portion of the color filter 354 may be disposed on the gate line GL, the TFT, and the data line DL. However, the invention is not limited thereto, and the color filter 354 may not overlap a connection portion between the drain electrode DE and the pixel electrode PE. In other words, the color filter 354 may not be disposed on the passivation layer 320 corresponding to the connection portion. In an exemplary embodiment, an edge portion of the color filter 354 may overlap an edge portion of another color filter 354 adjacent thereto. In an exemplary embodiment, the color filter 354 may include photo-sensitive organic materials.

A capping layer 391 is disposed on the color filter 354. The capping layer 391 may prevent dispersion of impurities generated in the color filter 354. In an exemplary embodiment, the capping layer 391 may include silicon nitride or silicon oxide, for example. An upper contact hole may be defined in the capping layer 391, and the upper contact hole may be disposed directly on the lower contact hole. The upper contact hole and the lower contact hole may be connected to each other to define a drain contact hole 360.

The pixel electrode PE is disposed in the pixel region P. In this case, as illustrated in FIG. 6, the pixel electrode PE may be disposed on the capping layer 391. Herein, the pixel electrode PE will be described below in detail with reference to FIG. 5.

The pixel electrode PE may include a stem electrode 613 and a plurality of branch electrodes 601a, 601b, 601c, and 601d. The stem electrode 613 and the branch electrodes 601a, 601b, 601c, and 601d may be integrally provided into a single unit.

The stem electrode 613 may partition the pixel region P into a plurality of domains. In an exemplary embodiment, the stem electrode 613 may include a horizontal portion 611 and a vertical portion 612 intersecting each other, for example. The horizontal portion 611 may partition the pixel region P into two domains, and the vertical portion 612 may partition each of the divided two domains into another two smaller domains. Accordingly, the pixel region P may be partitioned into four domains A, B, C, and D by the stem electrode 613 including the horizontal portion 611 and the vertical portion 612.

The branch electrodes 601a, 601b, 601c, and 601d may include first, second, third, and fourth branch electrodes 601a, 601b, 601c, and 601d each extending from the stem electrode 613 toward different directions. In other words, the first, second, third, and fourth branch electrodes 601a, 601b, 601c, and 601d may extend from the stem electrode 613 into the domain A, B, C, and D, respectively. In an exemplary embodiment, the first branch electrode 601a may be disposed in the first domain A, the second branch electrode 601b may be disposed in the second domain B, the third branch electrode 601c may be disposed in the third domain C, and the fourth branch electrode 601d may be disposed in the fourth domain D, for example.

The first branch electrode 601a and the second branch electrode 601b may have a symmetrical shape with respect to the vertical portion 612, and the third branch electrode 601c and the fourth branch electrode 601d may have a symmetrical shape with respect to the vertical portion 612. Further, the first branch electrode 601a and the fourth branch electrode 601d may have a symmetrical shape with respect to the horizontal portion 611, and the second branch electrode 601b and the third branch electrode 601c may have a symmetrical shape with respect to the horizontal portion 611.

The first branch electrodes 601a may be provided in plural in the first domain A, and in this case, the plurality of first branch electrodes 601a may be aligned parallel to each other. In this regard, a part of the first branch electrodes 601a may extend from a side of the horizontal portion 611 in the first domain A in a diagonal direction with respect to the side thereof. Further, the rest of the first branch electrodes 601a may extend from a side of the vertical portion 612 in the first domain A in a diagonal direction with respect to the side thereof.

The second branch electrodes 601b may be provided in plural in the second domain B, and in this case, the plurality of second branch electrodes 601b may be aligned parallel to each other. In this regard, a part of the second branch electrodes 601b may extend from a side of the horizontal portion 611 in the second domain B in a diagonal direction with respect to the side thereof. Further, the rest of the second branch electrodes 601b may extend from a side of the vertical portion 612 in the second domain B in a diagonal direction with respect to the side thereof.

The third branch electrodes 601c may be provided in plural in the third domain C, and in this case, the plurality of third branch electrodes 601c may be aligned parallel to each other. In this regard, a part of the third branch electrodes 601c may extend from a side of the horizontal portion 611 in the third domain C in a diagonal direction with respect to the side thereof. Further, the rest of the third branch electrodes 601c may extend from a side of the vertical portion 612 in the third domain C in a diagonal direction with respect to the side thereof.

The fourth branch electrodes 601d may be provided in plural in the fourth domain D, and in this case, the plurality of fourth branch electrodes 601d may be aligned parallel to each other. In this regard, a part of the fourth branch electrodes 601d may extend from a side of the horizontal portion 611 in the fourth domain D in a diagonal direction with respect to the side thereof. Further, the rest of the fourth branch electrodes 601d may extend from a side of the vertical portion 612 in the fourth domain D in a diagonal direction with respect to the side thereof.

The aforementioned stem electrode 613 may further include a first connection portion 614a and a second connection portion 614b. The first connection portion 614a may be connected to an end portion of one side of the vertical portion 612, and the second connection portion 614b may be connected to an end portion of another side of the vertical portion 612. The first connection portion 614a and the second connection portion 614b may be aligned parallel to the horizontal portion 611. The first connection portion 614a and the second connection portion 614b may be integrally provided with the stem electrode 613.

End portions of a part of the first branch electrodes 601a disposed in the first domain A and end portions of a part of the second branch electrodes 601b disposed in the second domain B may be connected to each other by the first connection portion 614a. Likewise, end portions of a part of the third branch electrodes 601c disposed in the third domain C and end portions of a part of the fourth branch electrodes 601d disposed in the fourth domain D may be connected to each other by the second connection portion 614b.

The pixel electrode PE and the storage line 752 may overlap each other. In an exemplary embodiment, an edge portion of the pixel electrode PE may be disposed on the storage line 752, for example.

In addition, the pixel may further include a shielding electrode 802. The shielding electrode 802 may be disposed on the capping layer 391 to overlap the data line DL. The shielding electrode 802 may include the same material as that included in the pixel electrode PE. A common voltage Vcom (refer to FIG. 2) may be applied to the shielding electrode 802.

Further, the pixel may further include a compensation bar 661 provided in a bar shape. The compensation bar 661 may be disposed opposite to the pixel electrode PE with reference to the compensation portion 412 of the gate line GL therebetween. The compensation bar 661 may be integrally provided with the pixel electrode PE. The compensation bar 661 may be aligned parallel to the line portion 411 of the gate line GL. The compensation bar 661 may overlap the storage line 752 that encloses other pixels (e.g., lower pixel). The compensation bar 661 may include the same material and may have the same structure (a multi-layer structure) as those of the aforementioned source electrode SE. In other words, the compensation bar 661 and the source electrode SE may be simultaneously provided in the same process.

Further, the pixel may further include a first compensation electrode 561. The first compensation electrode 561 may extend from the drain electrode DE in one direction and may be at least partially disposed on the compensation portion 412 of the gate line GL.

In addition, the pixel may further include a second compensation electrode 562. The second compensation electrode 562 may extend from the drain electrode DE in another direction and may be at least partially disposed on the compensation portion 412 of the gate line GL.

In a case where a pixel has a configuration illustrated in FIG. 4, although a mask is misaligned and thus a pattern deviates from the desired position to a certain extent, a capacitance difference between pixels may hardly increase, which will be described in more detail with reference to FIGS. 4 and 7.

Figure 7:
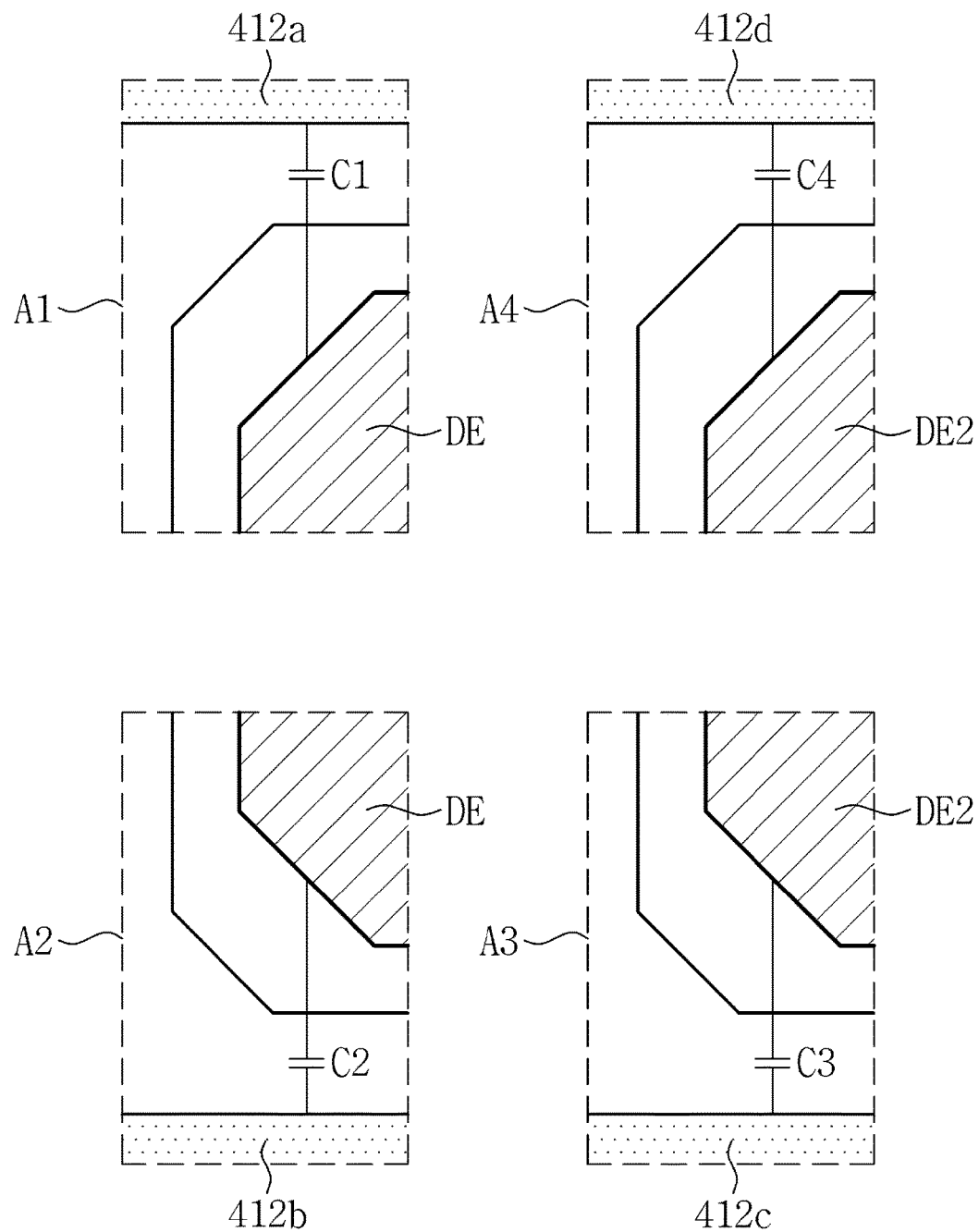
FIG. 7 is an enlarged view illustrating A1, A2, A3, and A4 of FIG. 4.

FIG. 7 is an enlarged view illustrating A1, A2, A3, and A4 of FIG. 4.

Firstly, a left-hand pixel of two pixels connected together to the gate line GL illustrated in FIG. 4 is defined as a first pixel PX1, and a right-hand pixel of the two pixels is defined as a second pixel PX2. A pixel electrode PE of the first pixel PX1 is disposed upwardly with reference to the gate line GL, and a pixel electrode PE2 of the second pixel PX2 is disposed downwardly with reference to the gate line GL. In this regard, only a portion of the pixel electrode PE2 in the second pixel PX2 is illustrated in FIG. 4.

Further, a portion between the drain electrode DE and the pixel electrode PE in the compensation portion 412 of the first pixel PX1 is defined as a first compensation portion 412a, and a portion between the drain electrode DE and the compensation bar 661 in the compensation portion 412 of the first pixel PX1 is defined as a second compensation portion 412b. Likewise, a portion between the drain electrode DE2 and the pixel electrode PE2 in the compensation portion of the second pixel PX2 is defined as a third compensation portion 412c, and a portion between the drain electrode DE2 and a compensation bar 662 in the compensation portion of the second pixel PX2 is defined as a fourth compensation portion 412d.

Further, a mask used to perform patterning of the ohmic contact layer 315, the data line DL, the source electrode SE, the drain electrodes DE and DE2, and the compensation electrode 561 is defined as a first mask, and a mask used to perform patterning of the pixel electrodes PE and PE2, the compensation bars 661 and 662, and the shielding electrode 802 is defined as a second mask.

If the first mask is improperly aligned and the ohmic contact layer 315, the data line DL, the source electrode SE, and the drain electrodes DE and DE2 are provided upwardly with reference to the desired position, the drain electrode DE and the first compensation portion 412a of the first pixel PX1 may become relatively closer in distance, whereas the drain electrode DE and the second compensation portion 412b of the first pixel PX1 may become relatively farther in distance. Accordingly, while the capacitance of a capacitor C1 disposed between the drain electrode DE and the first compensation portion 412a of the first pixel PX1 may increase, the capacitance of a capacitor C2 disposed between the drain electrode DE and the second compensation portion 412b of the first pixel PX1 may decrease. In case of such misalignment of the first mask, the drain electrode DE2 and the third compensation portion 412c of the second pixel PX2 may become relatively farther in distance, whereas the drain electrode DE2 and the fourth compensation portion 412d of the second pixel PX2 may become relatively closer in distance. Accordingly, while the capacitance of a capacitor C3 disposed between the drain electrode DE2 and the third compensation portion 412c of the second pixel PX2 may decrease, the capacitance of a capacitor C4 disposed between the drain electrode DE2 and the fourth compensation portion 412d of the second pixel PX2 may increase. Accordingly, although the first mask is misaligned, a variation in the capacitance of the first pixel PX1 may become substantially equivalent to a variation in the capacitance of the second pixel PX2.

Further, when the second mask is improperly aligned and the pixel electrodes PE and PE2, the compensation bars 661 and 662, and the shielding electrode 802 are disposed upwardly with reference to the desired position, the pixel electrode PE and the first compensation portion 412a of the first pixel PX1 may become relatively farther in distance, whereas the compensation bar 661 and the second compensation portion 412b of the first pixel PX1 may become relatively closer in distance. Accordingly, while the capacitance of a capacitor disposed between the pixel electrode PE and the first compensation portion 412a of the first pixel PX1 may decrease, the capacitance of a capacitor disposed between the compensation bar 661 and the second compensation portion 412b of the first pixel PX1 may increase. Likewise, in case of such misalignment of the second mask, the pixel electrode PE2 and the third compensation portion 412c of the second pixel PX2 may become relatively closer in distance, however, the compensation bar 662 and the fourth compensation portion 412d of the second pixel PX2 may become relatively farther in distance. Accordingly, while the capacitance of a capacitor disposed between the pixel electrode PE2 and the third compensation portion 412c of the second pixel PX2 may increase, the capacitance of a capacitor disposed between the compensation bar 662 and the fourth compensation portion 412d of the second pixel PX2 may decrease. Accordingly, although the second mask is improperly aligned, a variation in the capacitance of the first pixel PX1 may become substantially equivalent to a variation in the capacitance of the second pixel PX2.

When the data line DL, the source electrode SE, and the drain electrodes DE and DE2 are disposed leftwardly or rightwardly with reference to the desired position due to the mask misalignment, the capacitance difference between the first pixel PX1 and the second pixel PX2 may be compensated through the use of the compensation electrode 561.

Figure 8:
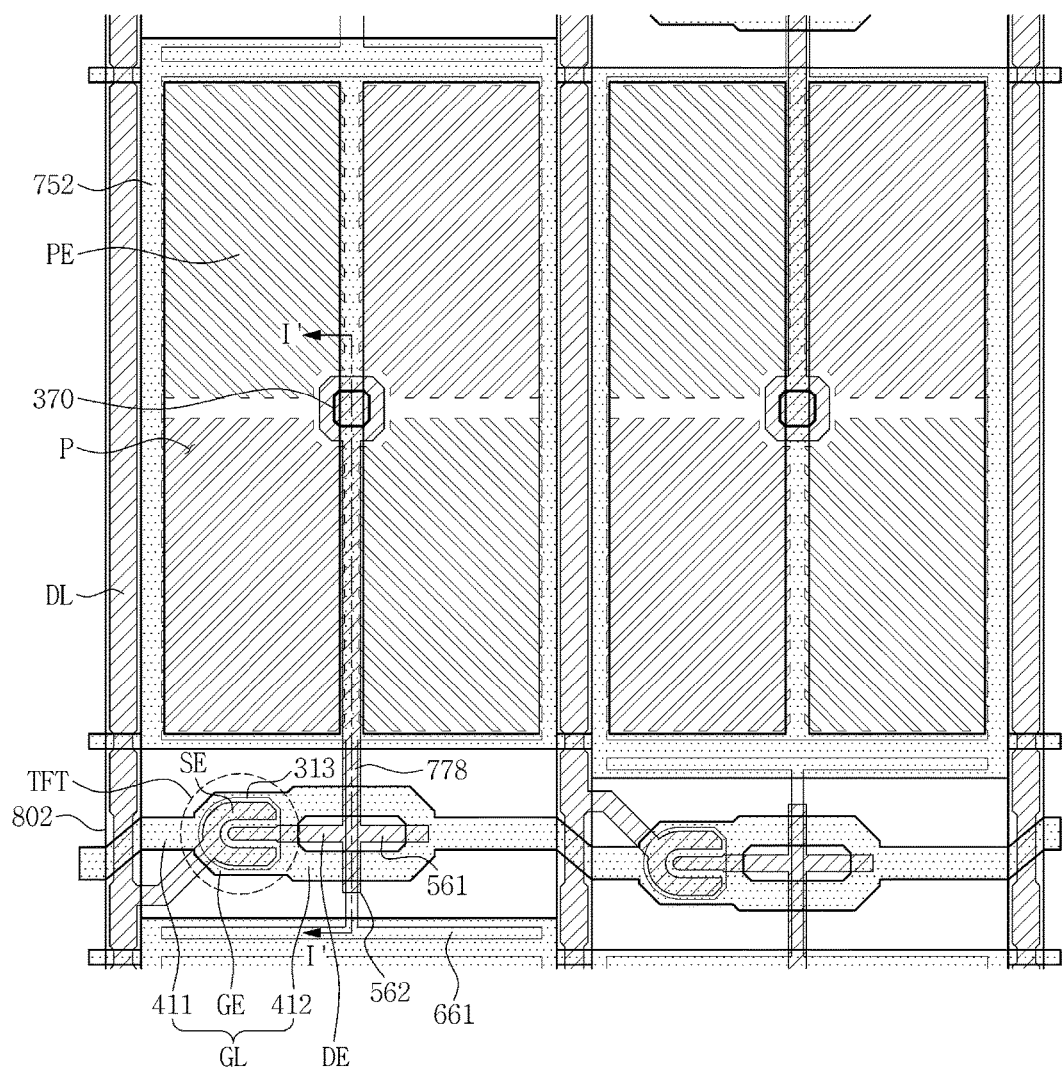
FIG. 8 is another detailed configuration view illustrating the several pixels of FIG. 3.
Figure 9:
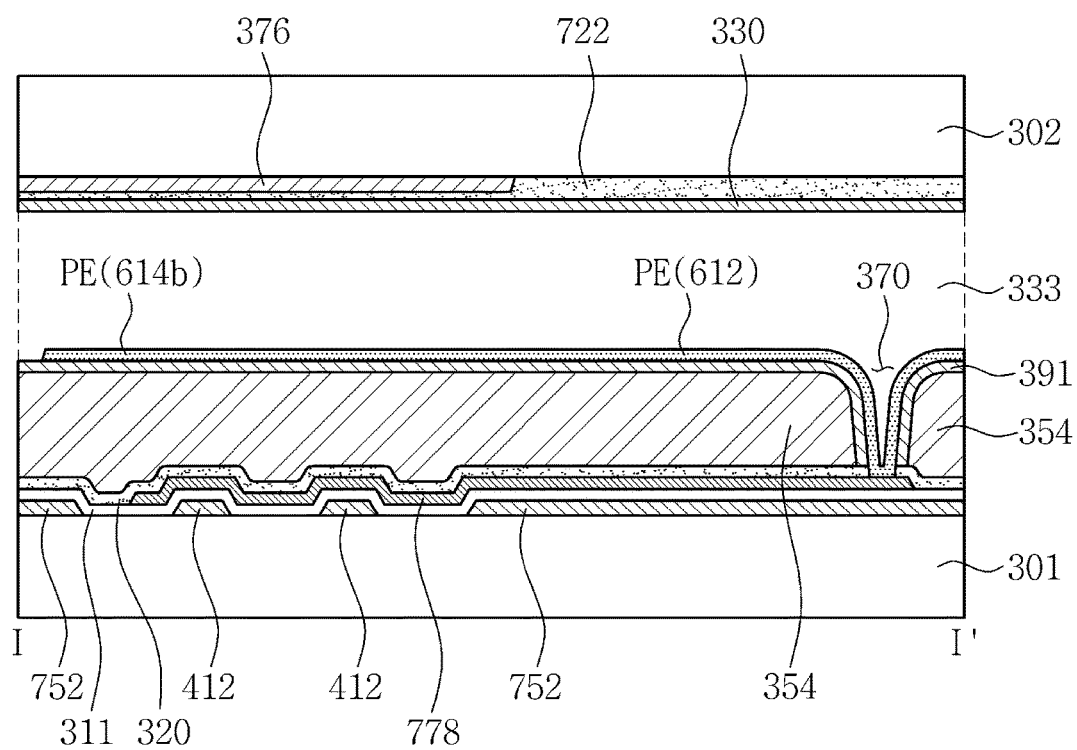
FIG. 9 is a cross-sectional view taken along line I-I' of FIG. 8.

FIG. 8 is another detailed configuration view illustrating the several pixels of FIG. 3 and FIG. 9 is a cross-sectional view taken along line I-I' of FIG. 8.

Each of the pixels, as illustrated in FIGS. 8 and 9, may include a TFT, a color filter 354, a pixel electrode PE, a common electrode 330, a liquid crystal layer 333, a gate line GL, a gate insulating layer 311, a data line DL, an ohmic contact layer, a passivation layer 320, a capping layer 391, a shielding electrode 802, a compensation bar 661, a compensation electrode 561, a black matrix 376, an overcoat layer 722, and a connecting electrode 778.

The TFT, the color filter 354, the pixel electrode PE, the common electrode 330, the liquid crystal layer 333, the gate line GL, the gate insulating layer 311, the data line DL, the ohmic contact layer, the passivation layer 320, the capping layer 391, the shielding electrode 802, the compensation bar 661, the compensation electrode 561, the black matrix 376, and the overcoat layer 722 illustrated in FIGS. 8 and 9 are identical to those illustrated in FIGS. 3 through 6 described above, and thus the descriptions pertaining thereto will make reference to the related descriptions of FIGS. 3 through 6.

The connecting electrode 778 may extend from the drain electrode DE to the pixel region P. The connecting electrode 778 may be integrally provided with the drain electrode DE. The connecting electrode 778 may overlap the pixel electrode PE. In an exemplary embodiment, the connecting electrode 778 may overlap a vertical portion 612 (refer to FIG. 5) of the pixel electrode PE, for example. An end portion of one side of the connecting electrode 778 overlapping the pixel electrode PE may be connected to the vertical portion 612. In other words, the connecting electrode 778 and the vertical portion 612 may be connected to each other through a drain contact hole 370 which is defined through the passivation layer 320 and the capping layer 391. The connecting electrode 778 may include the same material and have the same structure (a multi-layer structure) as those of the source electrode SE. In other words, the drain electrode DE and the source electrode SE may be simultaneously provided in the same process.

The storage line 752 may enclose the pixel electrode PE and may overlap the vertical portion 612 of the pixel electrode PE. The storage line 752 may include the same material and have the same structure (a multi-layer structure) as those of the gate line GL. In other words, the gate line GL and the storage line 752 may be simultaneously provided in the same process.

According to the pixel configuration illustrated in FIG. 8, although a mask is misaligned and thus a pattern deviates from the desired position to a certain extent, the respective pixels may become substantially equivalent in terms of capacitance variation, which will make reference to the descriptions described with reference to FIG. 4.

Figure 10:
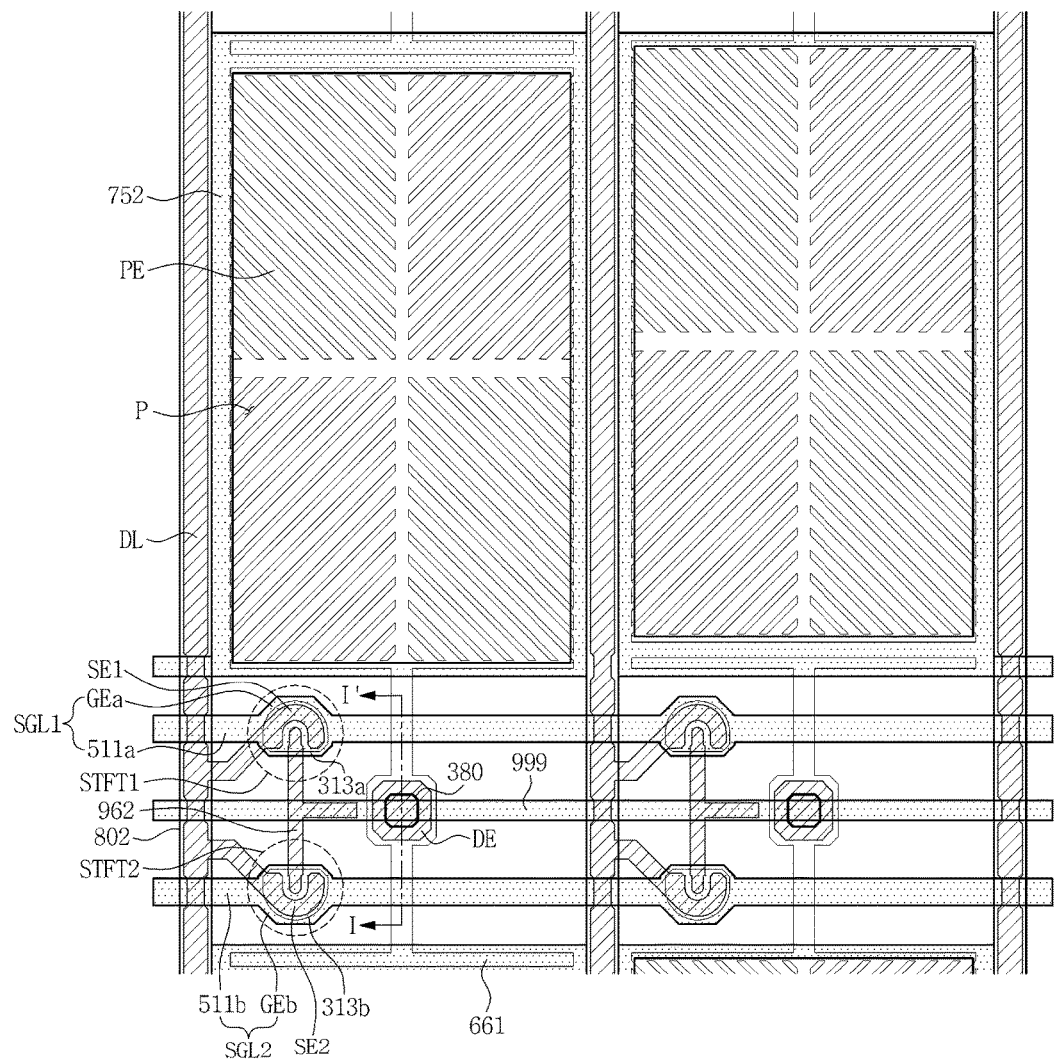
FIG. 10 is still another detailed configuration view illustrating the several pixels of FIG. 3.
Figure 11:
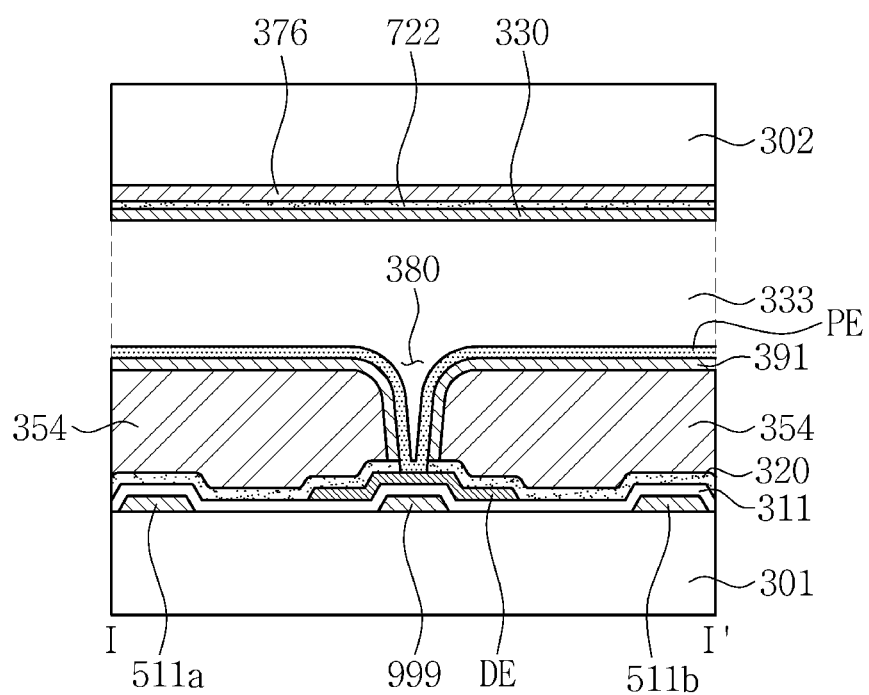
FIG. 11 is a cross-sectional view taken along line I-I' of FIG. 10.

FIG. 10 is still another detailed configuration view illustrating the several pixels of FIG. 3, and FIG. 11 is a cross-sectional view taken along line I-I' of FIG. 10.

Each of the pixels, as illustrated in FIGS. 10 and 11, may include a first sub-TFT STFT1, a second sub-TFT STFT2, a color filter 354, a pixel electrode PE, a common electrode 330, a liquid crystal layer 333, a first sub-gate line SGL1, a second sub-gate line SGL2, a gate insulating layer 311, a data line DL, a passivation layer 320, a capping layer 391, a shielding electrode 802, a compensation bar 661, a black matrix 376, an overcoat layer 722, a connecting electrode 962, and a repair line 999.

A storage line 752, the color filter 354, the pixel electrode PE, the common electrode 330, the liquid crystal layer 333, the gate insulating layer 311, the data line DL, the passivation layer 320, the capping layer 391, the shielding electrode 802, the compensation bar 661, the black matrix 376, and the overcoat layer 722 illustrated in FIGS. 10 and 11 are identical to those illustrated in FIGS. 3 through 6 described above, and thus the descriptions pertaining thereto will make reference to the related descriptions of FIGS. 3 through 6.

The first sub-gate line SGL1 is disposed on the first substrate 301. The first sub-gate line SGL1 may include a first line portion 511a and a first electrode portion GEa. The first electrode portion GEa is a gate electrode of the first sub-TFT STFT1 (hereinafter, "first gate electrode"). In an exemplary embodiment, the first sub-gate line SGL1 may include at least one of chromium (Cr), tantalum (Ta), and titanium (Ti), for example. The first sub-gate line SGL1 may have a multi-layer structure including at least two conductive layers which have different physical properties.

The second sub-gate line SGL2 is disposed on the first substrate 301. The second sub-gate line SGL2 may include a second line portion 511b and a second electrode portion GEb. The second electrode portion GEb is a gate electrode of the second sub-TFT STFT2 (hereinafter, "second gate electrode"). The second sub-gate line SGL2 may include the same materials as that included in the first sub-gate line SGL1.

In an exemplary embodiment, the first sub-gate line SGL1 and the second sub-gate line SGL2 may be connected to each other. In the exemplary embodiment, an end portion of one side of the first sub-gate line SGL1 and an end portion of one side of the second sub-gate line SGL2 corresponding thereto may be connected to each other, for example. Although not illustrated, the connection portion between the first sub-gate line SGL1 and the second sub-gate line SGL2 may be larger than other portions of the first sub-gate line SGL1 in size, so as to be properly connected to another layer or external driving circuits.

The data line DL may intersect the first sub-gate line SGL1 and the second sub-gate line SGL2. The data line DL may have a line width at a portion where the data line DL and the first sub-gate line SGL1 intersect each other less than a line width of other portions. Likewise, the data line DL may have a line width at a portion where the data line DL and the second sub-gate line SGL2 intersect each other less than a line width of other portions.

The first source electrode SE1 may extend from the data line DL to be disposed on the first electrode portion GEa of the first sub-gate line SGL1.

The second source electrode SE2 may extend from the data line DL to be disposed on the second electrode portion GEb of the second sub-gate line SGL2.

The connecting electrode 962 may be disposed on the first sub-gate line SGL1 and the second sub-gate line SGL2. In detail, one side of the connecting electrode 962 may be disposed on the first electrode portion GEa of the first sub-gate line SGL1 and another side of the connecting electrode 962 may be disposed on the second electrode portion GEb of the second sub-gate line SGL2.

The drain electrode DE may extend from the connecting electrode 962. The drain electrode DE may be disposed between the first sub-gate line SGL1 and the second sub-gate line SGL2.

The first sub-TFT STFT1 may include a first semiconductor layer 313a, the first gate electrode GEa, the first source electrode SE1, and the drain electrode DE. The first sub-TFT STFT1 may have a size less than that of the TFT illustrated in FIG. 4. In an exemplary embodiment, the first sub-TFT STFT1 may have a size half the size of the TFT, for example.

The second sub-TFT STFT2 may include a second semiconductor layer 313b, the second gate electrode GEb, the second source electrode SE2, and the drain electrode DE. The second sub-TFT STFT2 may have a size less than that of the TFT illustrated in FIG. 4. In an exemplary embodiment, the second sub-TFT STFT2 may have a size half the size of the TFT, for example.

The repair line 999 may be disposed between the first sub-gate line SGL1 and the second sub-gate line SGL2. The repair line 999 may overlap the drain electrode DE. The repair line 999 is configured to connect a broken portion, when the drain electrode DE is broken. When a laser beam is irradiated on an area where the repair line 999 and the drain electrode DE overlap each other, the repair line 999 and the drain electrode DE may be electrically connected to each other.

In a case where the pixel has a configuration described in FIG. 10, although a mask is misaligned and thus a pattern deviates from the desired position to a certain extent, capacitance variations of the respective pixels may become substantially equivalent, which will make reference to the related descriptions of FIG. 4.

From the foregoing, it will be appreciated that various exemplary embodiments in accordance with the disclosure have been described herein for purposes of illustration, and that various modifications may be made without departing from the scope and spirit of the teachings. Accordingly, the various exemplary embodiments disclosed herein are not intended to be limiting of the true scope and spirit of the teachings. Various features of the above described and other exemplary embodiments can be mixed and matched in any manner, to produce further exemplary embodiments consistent with the invention.

What is claimed is:

1. A liquid crystal display device comprising:
    a first substrate;
    a second substrate opposing the first substrate;
    a liquid crystal layer between the first substrate and the second substrate;
    a black matrix on one of the first substrate and the second substrate and defining a pixel region;
    a gate line on the first substrate and comprising a line portion, an electrode portion and a compensation portion, the compensation portion having a closed loop shape;
    a data line intersecting the gate line;
    a source electrode extending from the data line and disposed on the electrode portion of the gate line;
    a drain electrode including one side disposed on the electrode portion of the gate line and another side at least partially disposed on the compensation portion of the gate line;
    a pixel electrode in the pixel region and connected to the drain electrode, and
    a compensation electrode extending from the drain electrode and at least partially disposed on the compensation portion of the gate line.

2. The liquid crystal display device of claim 1, further comprising a compensation bar on a side opposite to the pixel electrode with the compensation portion of the gate line interposed therebetween, the compensation bar integrally provided with the pixel electrode.

3. The liquid crystal display device of claim 2, wherein the compensation bar is parallel to the line portion of the gate line.

4. The liquid crystal display device of claim 3, further comprising a storage line overlapping at least one of the pixel electrode and the compensation bar.

5. The liquid crystal display device of claim 1, wherein the pixel electrode comprises:
    a stem electrode which partitions the pixel region into a plurality of domains; and
    a branch electrode extending from the stem electrode to each of the plurality of domains.

6. The liquid crystal display device of claim 1, further comprising a color filter on the first substrate.

* * * * *